(12) United States Patent
Hovgaard et al.

(10) Patent No.: US 11,661,920 B2
(45) Date of Patent: *May 30, 2023

(54) WIND TURBINE CONTROL SYSTEM COMPRISING IMPROVED UPSAMPLING TECHNIQUE

(71) Applicant: VESTAS WIND SYSTEMS A/S, Aarhus N (DK)

(72) Inventors: Tobias Gybel Hovgaard, Ry (DK); Keld Hammerum, Hadsten (DK); Kasper Zinck, Fleming (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 19 days.

This patent is subject to a terminal disclaimer.

(21) Appl. No.: 17/338,443

(22) Filed: Jun. 3, 2021

(65) Prior Publication Data

US 2021/0293220 A1    Sep. 23, 2021

Related U.S. Application Data

(63) Continuation of application No. 16/303,850, filed as application No. PCT/DK2017/050167 on May 22, 2017, now Pat. No. 11,053,918.

(30) Foreign Application Priority Data

May 25, 2016   (DK) .......................... PA 2016 70350

(51) Int. Cl.
    *F03D 7/04*    (2006.01)
    *F03D 7/02*    (2006.01)
    *G05B 13/04*   (2006.01)

(52) U.S. Cl.
    CPC ........... *F03D 7/045* (2013.01); *F03D 7/0224* (2013.01); *F03D 7/047* (2013.01);
    (Continued)

(58) Field of Classification Search
    CPC .... F03D 7/045; F03D 7/047; F05B 2270/404; F05B 2270/803; G05B 13/048; G05B 2219/2619
    See application file for complete search history.

(56) References Cited

U.S. PATENT DOCUMENTS 10,337,497 B2   7/2019   Hammerum et al.
10,683,844 B2   6/2020   Hammerum et al.
(Continued)

FOREIGN PATENT DOCUMENTS

EP     2623776 A2     8/2013
WO     2016023561 A1  2/2016
(Continued)

OTHER PUBLICATIONS

Danish First Techincal Examination of PA No. 2016 70350 dated Dec. 22, 2016.
(Continued)

*Primary Examiner* — Pedro J Cuevas
(74) *Attorney, Agent, or Firm* — Patterson + Sheridan, LLP

(57) ABSTRACT

A wind turbine control unit includes an upsampling module that receives a first control signal that includes a current control sample value and a predicted control trajectory. The upsampling module also calculates a second control signal in dependence on the current control sample value and the predicted control trajectory. The second control signal has a higher frequency than the first control signal. The upsampling module further outputs the second control signal for controlling an actuator.

20 Claims, 5 Drawing Sheets

(52) U.S. Cl.
CPC ... *F05B 2270/328* (2013.01); *F05B 2270/404* (2013.01); *F05B 2270/803* (2013.01); *G05B 13/048* (2013.01); *G05B 2219/2619* (2013.01)

(56) References Cited

U.S. PATENT DOCUMENTS

| | | | |
|---|---|---|---|
| 11,231,012 B1* | 1/2022 | Shartzer | F03D 17/00 |
| 2013/0106107 A1 | 5/2013 | Spruce et al. | |
| 2017/0248124 A1 | 8/2017 | Hammerum et al. | |
| 2018/0142674 A1 | 5/2018 | Hammerum et al. | |
| 2018/0266392 A1* | 9/2018 | Hovgaard | F03D 7/045 |

FOREIGN PATENT DOCUMENTS

| | | |
|---|---|---|
| WO | 2016150447 A1 | 9/2016 |
| WO | 2017190744 A1 | 11/2017 |

OTHER PUBLICATIONS

PCT International Search Report for Application No. PCT/DK2017/050167 dated Sep. 13, 2017.

Arne Koerber et al: 11 Combined Feedback 1-14 Feed forward Control of Wind Turbines Using State-Constrained Model Predictive Contra 111 , IEEE Tran Sa Cti Ons on Control Systems Technology, IEEE Servi Ce Center, New York, NY, us, vol. 21, No. 4, Jul. 1, 2013 (Jul. 1, 2013). pp. 1117-1128, XP011515138, ISSN: 1063-6536, DOI: 10.1109/TCST.2013.2260749 p. 1117, p. 1119.

David A Hall: 11 Techniques for interpolation and digital upconversion: when choosing an interpolation technique, pulse-shaping or multi-stage interpolation methods should be considered 11 Wireless Design & Development, vol. 15, No. 8, Aug. 1, 2007 (Aug. 1, 2007), p. 28, XP055401366, ISSN: 1076-4240 p. 1-p. 2.

Li Tan: 11 Multirate DSP part 1:Upsampling and downsampling : EE Times 11 , *Apr. 21, 2003 (Apr. 21, 2008), XP055401033,Retrieved from the Internet: URL:http://www.eetimes.com/document.asp?doc id=l275556&pagenumber=3 [retrieved on Aug. 24, 2017].

PCT Written Opinion International Searching Authority for Application No. PCT/DK2017/1050167 dated Sep. 13, 2017.

Eurpean Patent Office, Communication under Rule 71(3) EPC for European Patent Application No. 17727100.4-1215, dated Nov. 17, 2022.

* cited by examiner

WIND TURBINE CONTROL SYSTEM COMPRISING IMPROVED UPSAMPLING TECHNIQUE

CROSS-REFERENCE TO RELATED APPLICATIONS

This application is a continuation of co-pending U.S. patent application Ser. No. 16/303,850 filed Nov. 21, 2018, which is a U.S. National Stage Entry of PCT/DK2017/050167 filed on May 22, 2017, which claims priority to Danish Patent Application PA 2016 70350 filed on May 25, 2016. Each of these applications are hereby incorporated by reference in their entirety.

TECHNICAL FIELD

The present invention relates generally to a wind turbine control system in which an upsampling technique is used to increase the signal rate between an actuator system and a control unit that controls said actuator system.

BACKGROUND

A wind turbine comprises multiple systems all of which must be controlled to function together so that the wind turbine provides a target power output in a wide range of wind conditions. In this context it is possible that a control unit for a given actuator system provides a digital control signal which does not match the required input rate of the actuator system. For example, a pitch actuator system comprising a hydraulic actuator and an actuator position control unit may require a relatively high input signal rate whereas a pitch control unit that sends pitch position commands to the pitch actuator system provides an output signal at a relatively low rate. In such a case, it is necessary to convert the relatively low rate control signal from the pitch control unit to a higher rate signal so that it can processed correctly by the pitch actuator system. Such signal rate conversion is achieved conventionally by a suitable upsampling technique, in which the output signal of an upsampler includes the existing samples of the input signal as well as new samples inserted between the existing samples according to a predefined integer conversion factor.

Known approaches to signal upsampling include zero-order hold and zero stuffing. In a zero-order hold technique, the additional samples inserted between the existing samples are given a value equal to the immediately preceding existing sample, whereas in a zero-stuffing technique, those additional samples are given a value of zero. In both approaches, a low-pass post-filter serves to smooth out discontinuities in the signal and avoid aliasing. Although filtering in theory addresses the aliasing issue, aliasing can still occur and, moreover, the filtering introduces a phase delay in the control signal which is undesirable in the context of controlling a dynamically changing system.

Against this background, the present invention aims to provide an improved upsampling methodology suitable for use within a control system in a wind turbine.

SUMMARY OF THE INVENTION

In a first aspect, embodiments of the invention provide a wind turbine control unit comprising: a control module configured to control an actuator system by outputting a first control signal, wherein the first control signal includes a current control sample value and a predicted control trajectory; the control unit further comprising an upsampling module configured to receive the first control signal from the control module, and to output a second control signal for controlling the actuator system, the second control signal having a higher frequency that the first control signal. The upsampling module calculates the second control signal in dependence on the current control sample value and the predicted control trajectory.

The invention can also be expressed as a method of operating a control unit of a wind turbine control system to control an actuator system thereof, the method comprising generating, using a control module, a first control signal comprising a current control sample value and a predicted control trajectory; and generating, using an upsampling module, a second control signal for controlling the actuator system, the second control signal having a higher frequency than the first control signal; wherein the upsampling module calculates the second control signal in dependence on the current control sample value and the predicted control trajectory.

The invention also extends to a wind turbine control system comprising a control unit as defined above, and also to a computer program product downloadable from a communications network and/or stored on a machine readable medium, comprising program code instructions for implementing the method as defined above.

The second control signal may comprise a first control sample value that corresponds to a current control sample value of the first control signal, and one or more further control sample values based on the predicted control trajectory.

A benefit of the invention is that the relatively slow control signal output by the control module is upsampled into a faster version of that signal using an approach that is based on the predicted control trajectory that is output by the control module. That is to say, the control sample values that are added to existing control samples or 'control moves' generated by the control module are based on knowledge of the predicted control trajectory. This provides a more accurately reproduced control signal at a higher frequency that is suitable for onward processing which does not suffer from the problems of aliasing and delay that exist with conventional upsampling techniques. The dynamic response of the actuator system is improved such that it exhibits lower overshoot and is more optimally damped.

The upsampling module may calculate the one or more further control sample values using an interpolation function applied to the current control sample value and one or more sample values of the predicted control trajectory and which is based on a ratio of sampling rates of the control module and the actuator system. The interpolation function may include a first order interpolation function that uses a single sample value of the predicted control trajectory, in particular a single sample value that immediately follows the current control sample value. Alternatively, the interpolation function may include a second order interpolation function that uses two sample values of the predicted control trajectory, in particular two sample values that immediately follow the current sample value.

In one embodiment, the control module comprises a receding horizon control algorithm which calculates repeatedly a predicted control trajectory with respect to each occurrence of a current control sample. Moreover, a model predictive control (MPC) routine may be employed.

In one embodiment, the actuator system includes at least one pitch actuator for controlling the pitch of a respective one or more wind turbine blades.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

One or more embodiments of the invention will now be described, by way of example only, with reference to the accompanying drawings, in which.

DETAILED DESCRIPTION

Figure 1:
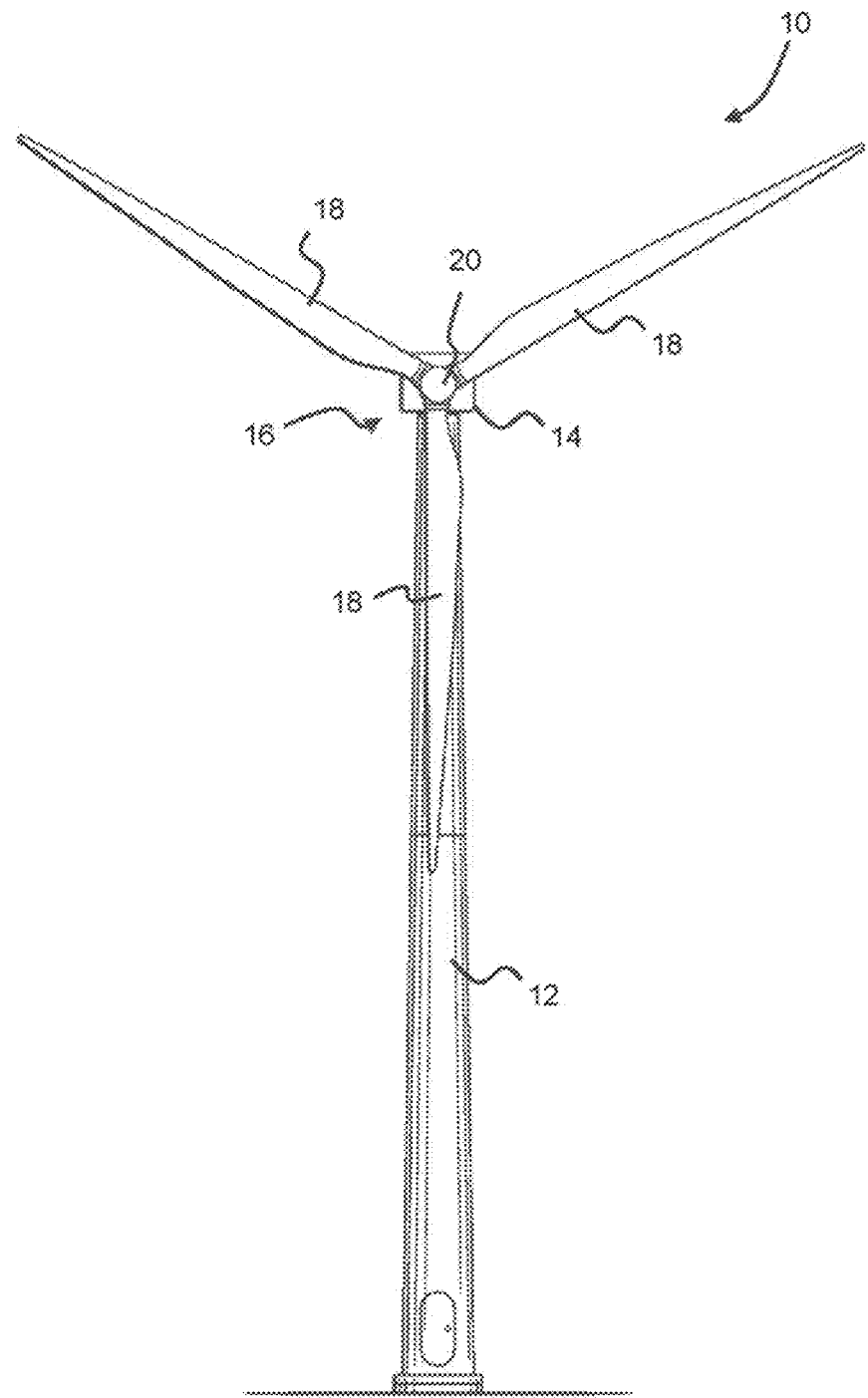
FIG. 1 shows a wind turbine in which embodiments of the invention may be incorporated.

FIG. 1 shows a wind turbine 10 in which an embodiment of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible.

Figure 2:
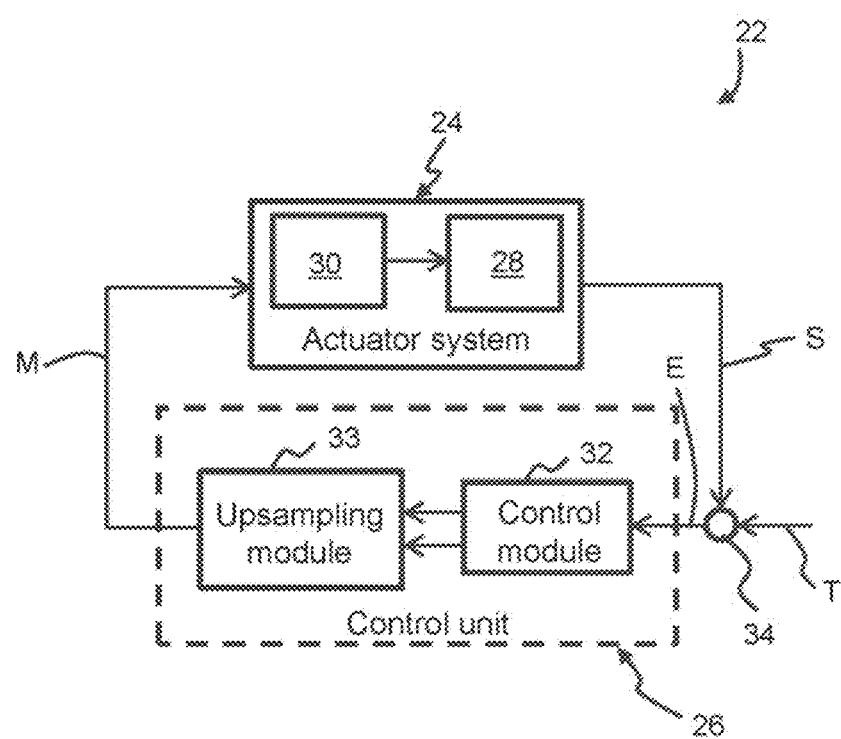
FIG. 2 is a schematic view of a control system in accordance with an embodiment of the invention.

FIG. 2 shows a wind turbine control system 22 in accordance with an embodiment of the invention which may be implemented in the wind turbine 10 of FIG. 1. Here, the control system 22 includes an actuator system 24 that is controlled by a control unit 26. In this particular embodiment, the actuator system 24 may be a pitch system for controlling the pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28, typically at a high frequency rate, for example in the order of 100 Hz or higher.

It should be appreciated that the control unit 26 and actuator system 24 may be replicated for each of the blades 18 of the wind turbine 10 so that the position of each blade 18 may be controlled independently.

It should be noted at this point that the pitch system of the wind turbine 10 is just one example of a wind turbine system that could be controlled and that the control unit 26 could also be used to control other wind turbine systems. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system that requires high speed real time control.

Returning to FIG. 2, the control unit 26 comprises two functional components: a control module 32 and an upsampling module 33. These functional modules are illustrated separately here for convenience, although it should be appreciated that this does not imply that such functions must be implemented in separate hardware or software modules. In overview, the control module 32 outputs a control signal that is generated using a dynamic model of the actuator system that predicts how the system will respond to control inputs. Beneficially, the control module 32 implements a receding horizon control methodology, which is also known as a Model Predictive Control or 'MPC' algorithm, such as is described in WO2016/023561. As is known, therefore, MPC algorithms implement an optimization model that yields a predicted trajectory of future timeslots of the control signal, or 'control sample values' or 'control moves', which allows the current sample value to be optimized and implemented while keeping future time slots in account. As the control module 32 implements Model Predictive Control, it therefore has a predictive ability about the future state of the actuator system to be controlled which has particular application in complex dynamic systems which are difficult for traditional PID controllers to control effectively since they do not have such predictive functionality. Although such MPC-based controllers provide benefits in terms of the accuracy with which an actuator system is able to be controlled, they tend to operate at a lower frequency largely due to their computational complexity, compared to the actuator system being controlled. Expressed another way, the actuator system requires a control signal having a frequency or rate that is higher, for example, by a factor of 10 or even by a factor of 100, than that of the control signal output by the MPC-based control module.

The embodiments of the invention provide a solution to this problem by providing the control unit 26 with the upsampling module or simply 'upsampler' 33 which takes the relatively slow control signal output by the control module 32 and outputs a faster version of the control signal that is compatible with the actuator system 24. As will be appreciated from the discussion that follows, the upsampling module 33 takes advantage of the MPC approach implemented by the control module 32 by outputting a second or 'modified' control signal that is based on the predicted control trajectory generated by the control module 32. That is to say, the control sample values that are added between the existing control sample values or control moves of the original control signal at the lower frequency are based on knowledge of the control trajectory generated by the MPC algorithm implemented by the control module. This provides a more accurately reproduced control signal at a higher frequency that is suitable for onward processing which does not suffer from the problems of aliasing and delay that exist with conventional upsampling techniques. Ultimately, the dynamic response of the actuator system is improved such that it exhibits lower overshoot and is more optimally damped.

The implementation of the control unit 26 will now be described in more detail with reference to FIG. 2. The general function of the control unit 26 is to control the actuator system 24 so that its output, that is to say the position of the pitch actuator in this particular example, is equal to a target value as determined by a higher level controller, for example a pitch angle controller (not shown, but its presence is implied). To this end, the control unit 26 receives an input signal from a summing junction 34 which provides the error 'E' between the current state of the actuator system indicated here as 'S', which in this case may be the current actuator position, and a target value which is indicted here as T. The control unit 26 is operable to control the actuator system 24 to drive its state S, i.e. the pitch position of the actuator 28, to a value that is equal to the target value T, thereby minimising the error E.

In response to the signal E, the control module 32 calculates one or more predicted control trajectories over a moving time horizon or window. The predicted control trajectory is a sequence of optimised control moves for a predetermined time horizon, calculated for a number of discrete time steps. For example, the predicted control trajectory, u(t), may comprise a string of optimised control moves for a number of discrete time steps, t=k, t=k+1, t=k+2, ..., t=k+p, where t=k+p is the final time step of the given time horizon, such that u(k) is the current sample value, which may be expressed as follows:

$$u(t)=u(k),u(k+1),u(k+2),\ldots,u(k+p).$$

Figure 3:
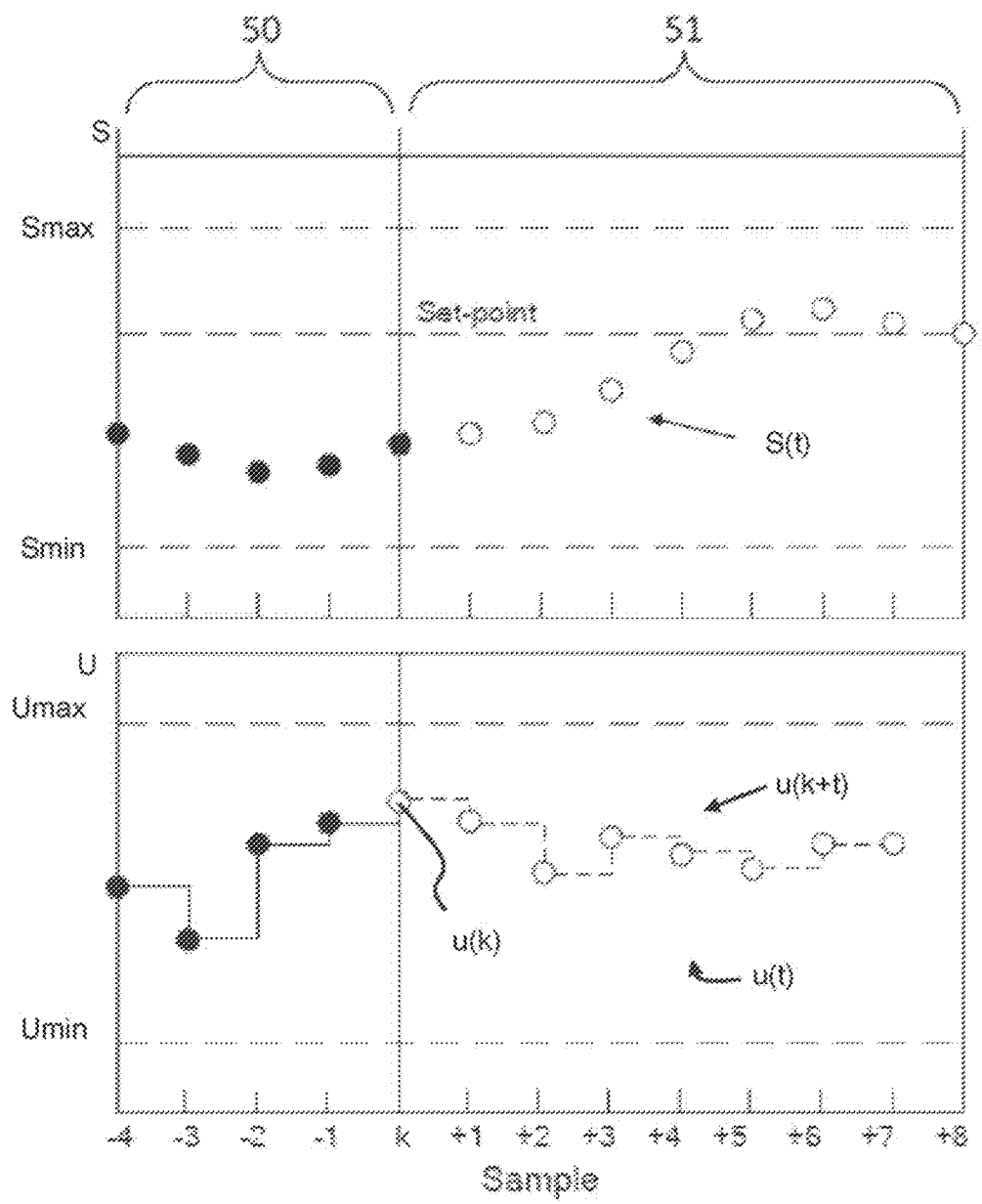
FIG. 3 illustrates a control trajectory as determined by a Model Predicted Control (MPC) algorithm.

This is illustrated in FIG. 3, which shows a control trajectory that may be generated by way of example by the control module 32. The upper plot in FIG. 3 shows a predicted trajectory s(t) for the actuator state S whilst the lower plot shows the control trajectory u(t) for the control variable CU'. Historical values are shown as solid points and grouped as 50, whilst predicted values are shows as outlined points and grouped as 52.

In this example, the actuator state S is commanded to increase to a predetermined set-point whilst the control trajectory u(t) illustrates the current and predicted future control moves required to make the actuator state meet the set point. Note that it is the control sample value at time point k, marked here as u(k), that is usually implemented by a downstream controller whilst the future predicted control moves k+1, k+2 etc are used by the control module 32 to optimise the next control sample value.

Returning to FIG. 2, the control module 32 therefore outputs a first control signal u(t) to the upsampling module 33 which includes a current control sample value and one or more future control sample values or control moves, also referred to collectively as a 'predicted control trajectory', marked as u(k+t). It will be appreciated that the control signal may be output as a matrix of data points. The first or 'original' control signal that is output by the control module 32 is at a relatively low rate, which may be approximately 10 Hz, by way of example. However, a signal with such a rate cannot be implemented directly by the actuator system 24 which requires a much faster signal, for example 100 Hz, but may be much higher.

The upsampling module 33 therefore functions to convert the lower rate first control signal from the control module 32 to a signal with a higher rate that matches that required by the actuator system 24, such that the actuator system 24 is able to process the received signal correctly. For this, the upsampling module 33 implements an interpolation function that is applied to the current control sample value u(k) and the one or more control moves of the predicted control trajectory included in the first control signal u(t) from the control module 32.

In this embodiment, the interpolation function includes a first order interpolation function to be applied to the current control sample u(k) and the first predicted control move of the predicted control trajectory. However, in other embodiments of the invention the interpolation function may comprise a higher order interpolation function such as a second or third order interpolation function.

The process 100 by which the control unit 26 controls the actuator system 24 is described in more detail below.

Figure 4:
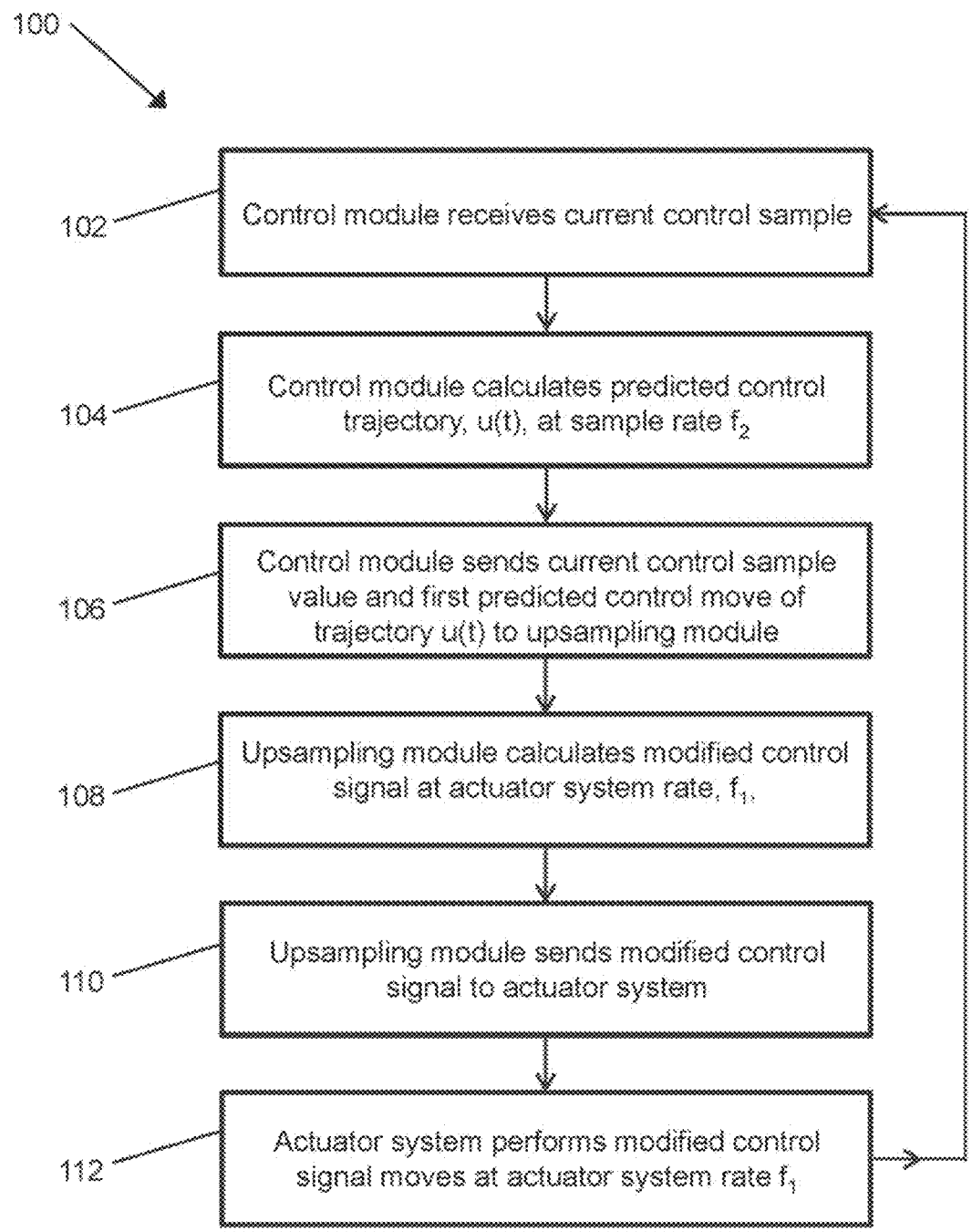
FIG. 4 is a process flow diagram in accordance with an embodiment of the invention; and, FIG. 5 is a series of data plots that illustrates an upsampling methodology in accordance with an embodiment of the invention.

Referring now to FIG. 4, the process 100 is initiated at step 102 when the control module 32 of the control unit 26 receives a sample value as part of the error signal E.

At step 104, the control module 32 calculates a control trajectory u(t) that is determined to minimise the error signal E in the established way. To this end, the control module 32 implements a Model Predictive Control algorithm to determine a control trajectory comprising a current control sample value u(k) as the prediction origin, and a predicted control trajectory, u(k+t), comprised of optimised control moves for discrete time steps for the specified time horizon, t=k+p The control module 32 outputs this data to the upsampling module 33 at step 106.

It should be noted at this point that the control module 32 outputs the control trajectory u(t) including the current control sample u(k) and the predicted control trajectory u(k+t) as a single set of data to the upsampling module 33. However, it is also envisaged that the current control sample u(k) and corresponding predicted control trajectory u(k+t) could be output as separate data sets. The skilled person will appreciate that the length of the predicted control trajectory will depend on the system to be controlled, that is to say the oscillatory time period, and the sampling rate of the control module.

At step 108, the upsampling module 33 calculates a modified or 'second' control signal to output to the actuator system 24 which has a higher frequency than the first control signal. Firstly, the upsampling module 33 receives the current control sample, u(k), and the predicted control trajectory, u(k+t), from the control module 32. Then the upsampling module 33 uses these sample values, u(k), u(k+1), along with the known sample rates of the actuator system 24 and the control module 32 to calculate the modified control signal. For the purposes of this discussion, the frequency of the actuator system 24 is termed f1, and the output frequency of the control module 32 is termed f2. As has been mentioned previously, f1>f2 for example by a factor of 10.

In general terms, rather than carry out a conventional upsampling technique in which additional sample values are added at either zero value (zero stuffing) or at a value of the previous control sample (zero order hold), combined with suitable post-filtering, the upsampling module 33 provides a modified signal which comprises additional sample values that are based on the current control sample and one or more of the control moves of the predicted control trajectory u(k+t). By adding samples in the period between successive control samples sent by the control module 32, the output of the upsampling module 33 has a higher frequency. For example, if nine samples are added (10-1 samples to account for the existing control sample), the frequency is increased by a factor of 10 compared to the frequency of the first control signal.

To generate the modified control signal, the upsampling module 33 applies a first order interpolation function to the current control sample, u(k), and the first predicted control move, u(k+1) to derive each of the additional control samples.

Each addition or 'intermediate' control sample can therefore be calculated using the following relationship, next intermediate control sample =

$$\text{current control sample} + \left( \frac{u(k+1) - u(k)}{\frac{f_1}{f_2}} \right).$$

Starting from t=k, this calculation is repeated at the higher subsample rate, $f_1$, until the next discrete time step of the controller, t=k+1, is reached. This results in the first predicted control move from the controller, u(k+1), being broken up into a number of smaller steps which can be executed at the higher sample rate of the actuator system, $f_1$.

Once the modified or 'second' control signal has been determined for the time period between t=k to t=k+1, the upsampling module 33 sends the modified control signal to the actuator system at step 110, as indicated as CM' on FIG. 2. At step 112, the actuator system 24 implements the control moves of the modified control signal M at the actuator system rate $f_1$. The process thereafter repeats for each sample data point that is received at the control module 32 at rate f1. Thus, at time t=k+1, the control module 32 receives a new current control sample of the actuator system and steps 104 to 112 are repeated to provide the actuator system 24 with a modified control signal for the time period t=k+1 to t=k+2.

Figure 5:
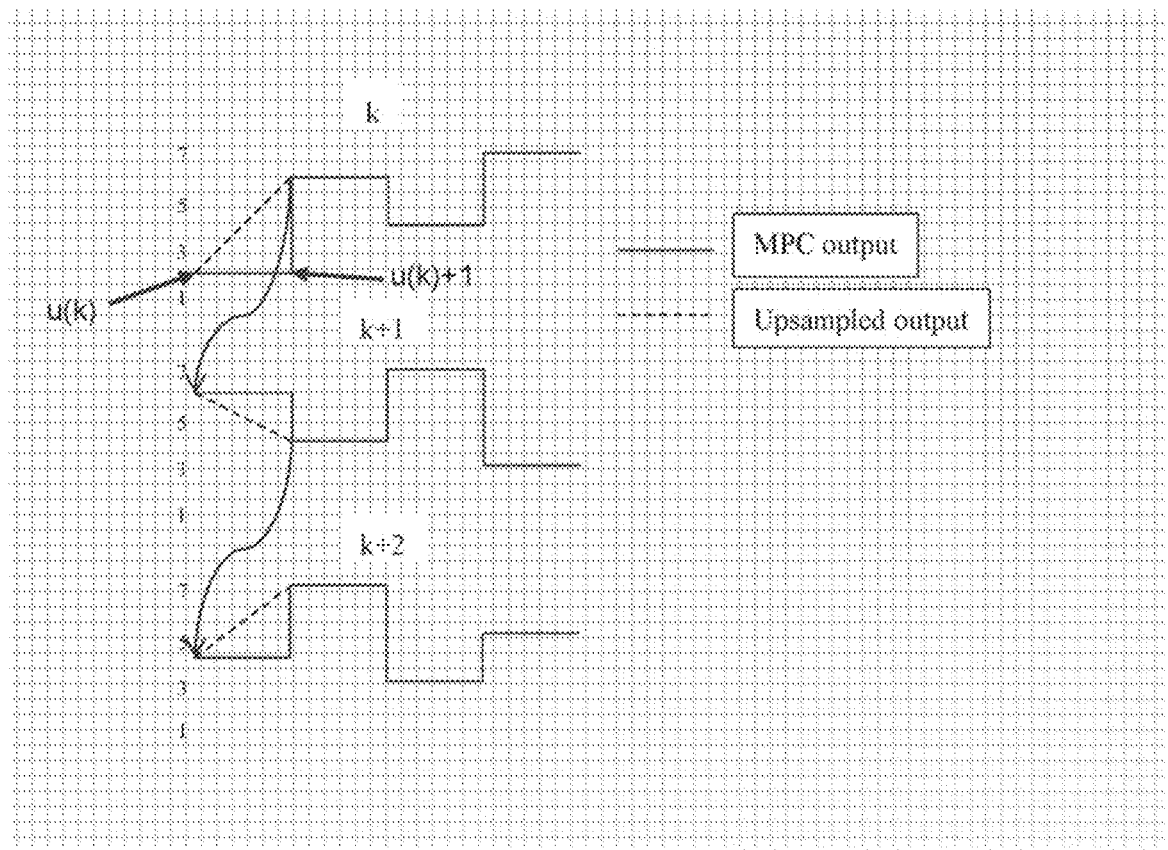

The above process is illustrated in FIG. 5 which shows a control trajectory u(t) at three sequential time steps k, k+1 and k+2. Considering firstly the first time step k, which is the uppermost plot, it will be seen that the second control signal (upsampled output) from the upsampling module 33 extends, or is interpolated, between the current control sample value u(k) and the first control move u(k+1) of the predicted control trajectory. The number of sample values forming part of the interpolation may be determined based on the scaling factor required between the control module 32 and the actuator system 24, that is to say, the ratio of the frequency of the actuator system to the frequency of the control module 32. For example, if the frequency of the actuator system is 100 Hz and the frequency of the control module 32 is 10 Hz, then the upsampling module 33 will add nine (f1/f2−1) additional sample values between the current control sample and the next sample from the control module 32.

The second and third plots in FIG. 5 show the next two successive time steps where the same process is applied.

It will be appreciated that various modifications may be made to the specific embodiments discussed above without departing from the inventive concept as defined by the claims.

For example, in the embodiment discussed above the additional control sample values in the second control signal M are based on a first order interpolation applied on the current control sample value u(k) and the next control move u(k+1) in the predicted control trajectory generated by the control module 32. That is to say, only the first of the predicted control moves are used to influence the additional control sample values. However, in a variant of the above process, the upsampling module 33 may use a second order interpolation function to calculate a modified control signal. In such a case, the control module 32 calculates a predicted control trajectory in the same way as in the first embodiment, although the upsampling module 33 takes into account two predicted control moves u(k+1), u(k+2) in addition to the current control sample u(k) to generate the additional control sample values. The upsampling module 33 then uses second order interpolation of these inputs and knowledge of the difference in frequencies of the actuator system and the control module to calculate the modified control signal M for output to the actuator system. The use of a second order interpolation function ensures continuity for both the actuator control moves and its derivative.

The invention claimed is:

1. A wind turbine control unit comprising an upsampling module configured to:
   receive a first control signal comprising a current control sample value and a predicted control trajectory;
   calculate a second control signal in dependence on the current control sample value and the predicted control trajectory, wherein the second control signal has a higher frequency than the first control signal; and
   output the second control signal for controlling an actuator.

2. The control unit of claim 1, wherein the second control signal comprises a first control sample value that corresponds to a current control sample value of the first control signal, and one or more further control sample values based on the predicted control trajectory.

3. The control unit of claim 2, wherein the upsampling module calculates the one or more further control sample values using an interpolation function applied to the current control sample value and one or more sample values of the predicted control trajectory and which is based on a ratio of sampling rates of a control module and an actuator system comprising the actuator.

4. The control unit of claim 3, wherein the interpolation function includes a first order interpolation function that uses a single sample value of the predicted control trajectory.

5. The control unit of claim 4, wherein the single sample value of the predicted control trajectory immediately follows the current control sample value.

6. The control unit of claim 3, wherein the interpolation function includes a second order interpolation function that uses two sample values of the predicted control trajectory.

7. The control unit of claim 6, wherein the second order interpolation function uses the two sample values that immediately follow the current control sample value.

8. The control unit of claim 1, further comprising a control module, wherein the control module comprises a receding horizon control algorithm which calculates repeatedly a predicted control trajectory with respect to each occurrence of a current control sample.

9. The control unit of claim 1, further comprising a control module, wherein the control module calculates the predicted control trajectory using an optimization model.

10. The control unit of claim 1, further comprising a control module, wherein the control module calculates the predicted control trajectory by implementing a model predictive control (MPC) routine.

11. The control unit of claim 1, wherein the actuator includes at least one pitch actuator for controlling a pitch of a respective one or more wind turbine blades.

12. The control unit of claim 1, wherein the control unit is disposed in a control system of a wind turbine.

13. A method comprising:
   generating, using a control module of a wind turbine, a first control signal comprising a current control sample value and a predicted control trajectory;
   calculating, using an upsampling module of the control module, a second control signal in dependence on the current control sample value and the predicted control trajectory, wherein the second control signal has a higher frequency than the first control signal; and outputting the second control signal for controlling an actuator.

14. The method of claim 13, wherein the second control signal comprises a first control sample value that corresponds to a current control sample value of the first control signal, and one or more further control sample values based on the predicted control trajectory.

15. The method of claim 14, wherein the one or more further control sample values are calculated using an interpolation function applied to the current control sample value and one or more sample values of the predicted control trajectory and which is based on a ratio of sampling rates of the control module and the actuator.

16. The method of claim 13, further comprising calculating repeatedly a predicted control trajectory with respect to each occurrence of a current control sample.

17. The method of claim 13, further comprising calculating the predicted control trajectory using an optimization model.

18. The method of claim 13, further comprising calculating the predicted control trajectory by implementing a model predictive control (MPC) routine.

19. The method of claim 13, wherein the actuator includes at least one pitch actuator for controlling a pitch of a respective one or more wind turbine blades.

20. A computer program product at least one of downloadable from a communications network and stored on a machine readable medium, comprising program code instructions for performing an operation when executed on a computer process, wherein the operation comprises:

generating, using a control module of a wind turbine, a first control signal comprising a current control sample value and a predicted control trajectory;

calculating, using an upsampling module of the control module, a second control signal in dependence on the current control sample value and the predicted control trajectory, wherein the second control signal has a higher frequency than the first control signal; and outputting the second control signal for controlling an actuator.

* * * * *